Sept. 23, 1952  H. P. PARIS  2,611,341
PORTABLE BATHING DEVICE FOR ANIMALS
Filed Aug. 13, 1948  4 Sheets-Sheet 1

FIG—1

HUGH P. PARIS
Inventor

By Smith & Tuck
Attorneys

Sept. 23, 1952 H. P. PARIS 2,611,341
PORTABLE BATHING DEVICE FOR ANIMALS
Filed Aug. 13, 1948 4 Sheets-Sheet 2

HUGH P. PARIS,
Inventor

Smith r Tuck
Attorneys

Sept. 23, 1952  H. P. PARIS  2,611,341
PORTABLE BATHING DEVICE FOR ANIMALS
Filed Aug. 13, 1948  4 Sheets-Sheet 3
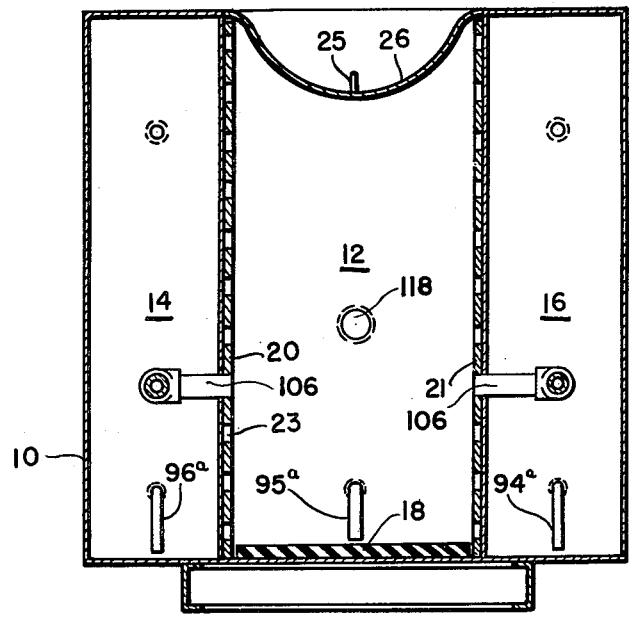
FIG_3
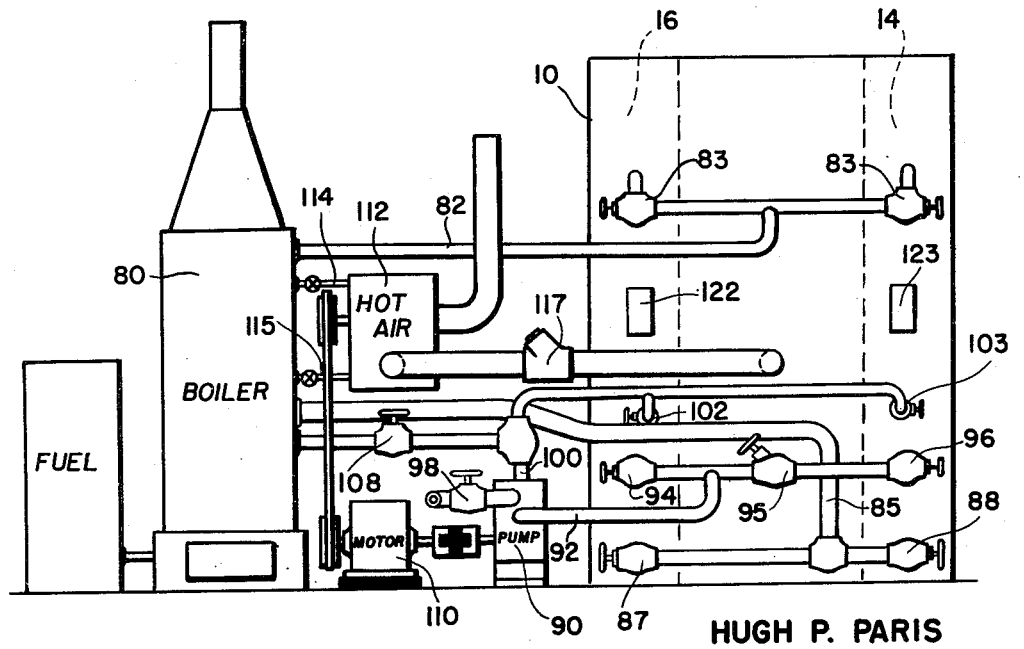
FIG_4
HUGH P. PARIS
Inventor
By Smith & Tuck
Attorneys Sept. 23, 1952     H. P. PARIS     2,611,341
PORTABLE BATHING DEVICE FOR ANIMALS
Filed Aug. 13, 1948     4 Sheets-Sheet 4
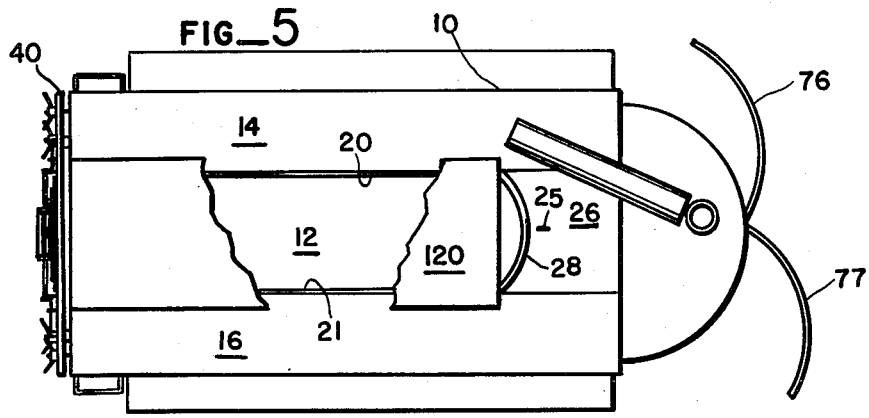
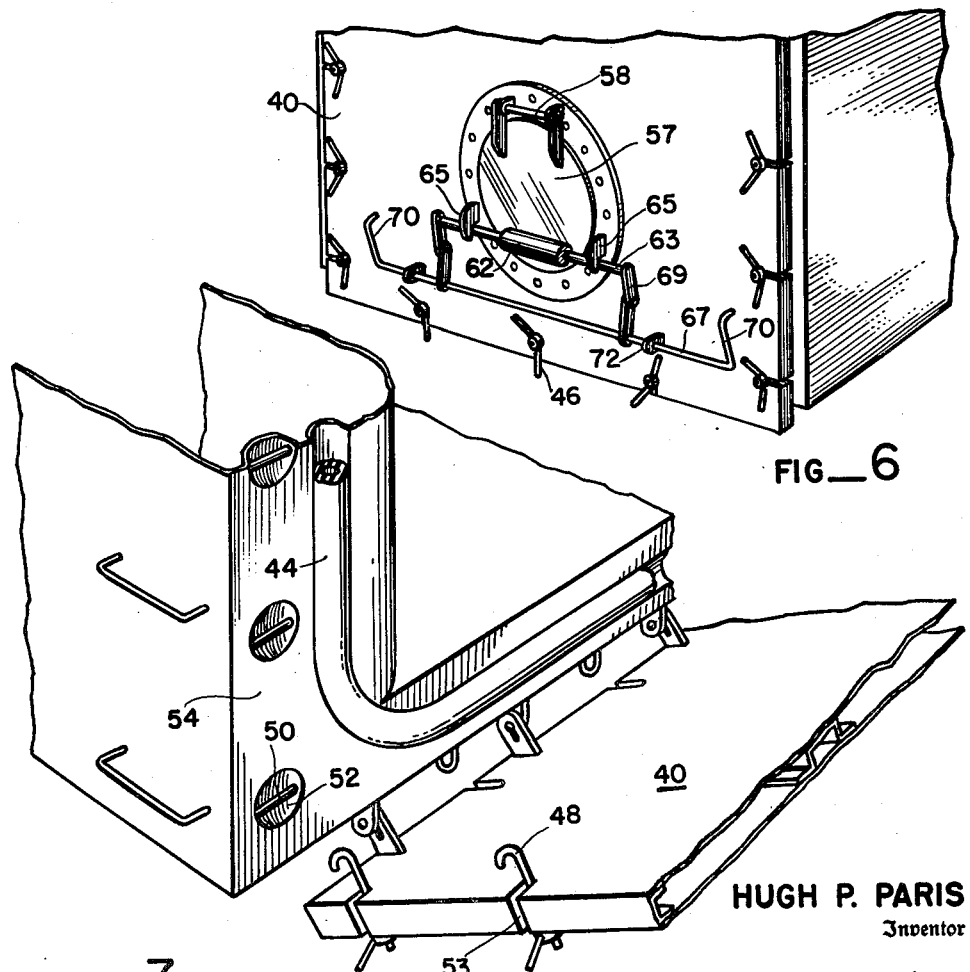
HUGH P. PARIS
Inventor
By Smith & Tuck
Attorney Patented Sept. 23, 1952

2,611,341

UNITED STATES PATENT OFFICE 2,611,341

PORTABLE BATHING DEVICE FOR ANIMALS

Hugh P. Paris, Seattle, Wash.

Application August 13, 1948, Serial No. 44,114

4 Claims. (Cl. 119—158)

My present invention relates to a conditioner for horses, and more particularly to a portable bathing device for animals.

Despite the technological development in many fields, very little attention has been provided for the treatment and bathing of horses. This lack of development is, no doubt, partly due to the long-standing belief that horses should not be bathed, and this is largely true of horses that are in their natural state. However, when we raise horses and cause them to be employed under conditions where for short periods they are required to develop a great deal of energy, we have created an unnatural condition for the welfare of horses. Consequently, it is necessary, in keeping with such changed conditions, that we provide for bathing and treating horses.

In my present equipment, I provide means whereby a horse can be bathed in water of any desired temperature, and the baths can also be of a medicated or chemical nature. Means is provided for directing swirling streams of water against certain parts of his body or legs. I further provide means whereby a horse can be floated off his feet so that he can actually swim in place, and thus provide a therapy that in the past has only been available to humans, and which has proved to be very valuable when properly applied.

The principal object of my invention, therefore, is to provide a convenient manner in which to bathe a horse, to give him medicated treatment for his skin, and to exercise him in water.

A further object of my invention is to provide means whereby a bathtub for horses and other large animals can be arranged as a complete unit that will provide water of any desired temperature.

A further object of my invention is to provide means whereby a bathing tub for horses can be mounted upon a trailer or in a truck so that it will be convenient to transport from place to place.

A further object of my invention is to provide means whereby adequate tankage is provided so that a horse may be entered into my bathtub while the same is dry, and then the desired amount of water can be introduced into the bathtub proper.

A further object of my invention is to provide adequate tankage so that the water in which the horse is bathed can be restored to the tank and the bathtub portion can be drained substantially dry.

A further object is to provide a means for giving therapeutic treatment to a horse while he is floating in water.

Further objects, advantages and capabilities will be apparent from the description and disclosure in the drawings, or may be comprehended or are inherent in the device.

In the drawings:

Figure 3 is a cross-sectional view taken along the line 3—3 of Figure 2.

Figure 4 is a diagrammatic view to more clearly illustrate some of the various elements essential in making up my present equipment.

Figure 5 is a top plan view of my invention.

Figure 6 is an enlarged fragmentary perspective view showing the emergency water discharge arrangement employed, together with the means I employ for securing my end gate in place.

Figure 7 is an enlarged fragmentary perspective view showing certain details of structure as encountered at one corner of the rear of my bathing tub.

Figure 1:
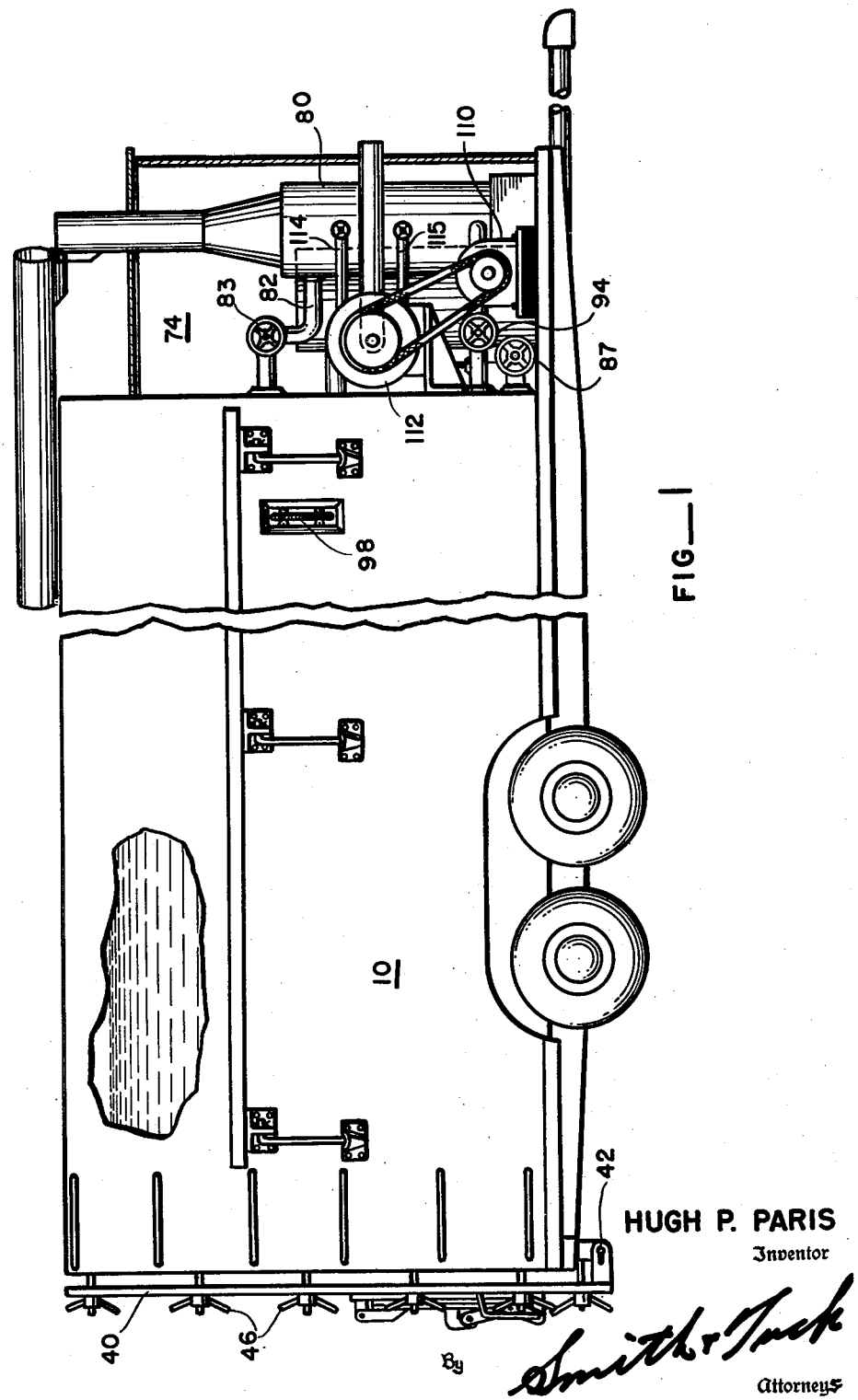
Figure 1 is a side elevation of a horse-bathing tub shown broken in length, and partly in section, to better illustrate the construction.

Referring more particularly to the disclosure in the drawings, the numeral 10 designates generally my bathtub. This, as a matter of convenience, is preferably made of metal in order that it may be watertight, and consists of the bathing tub proper 12, and disposed on each side of tub 12 are water storage tanks, as 14 and 16. The tub proper, in order that no metal will touch the animal, is provided with preferably a resilient floor, and lining walls 20 and 21, which are preferably perforated, as by a plurality of openings 23.

Figure 2:
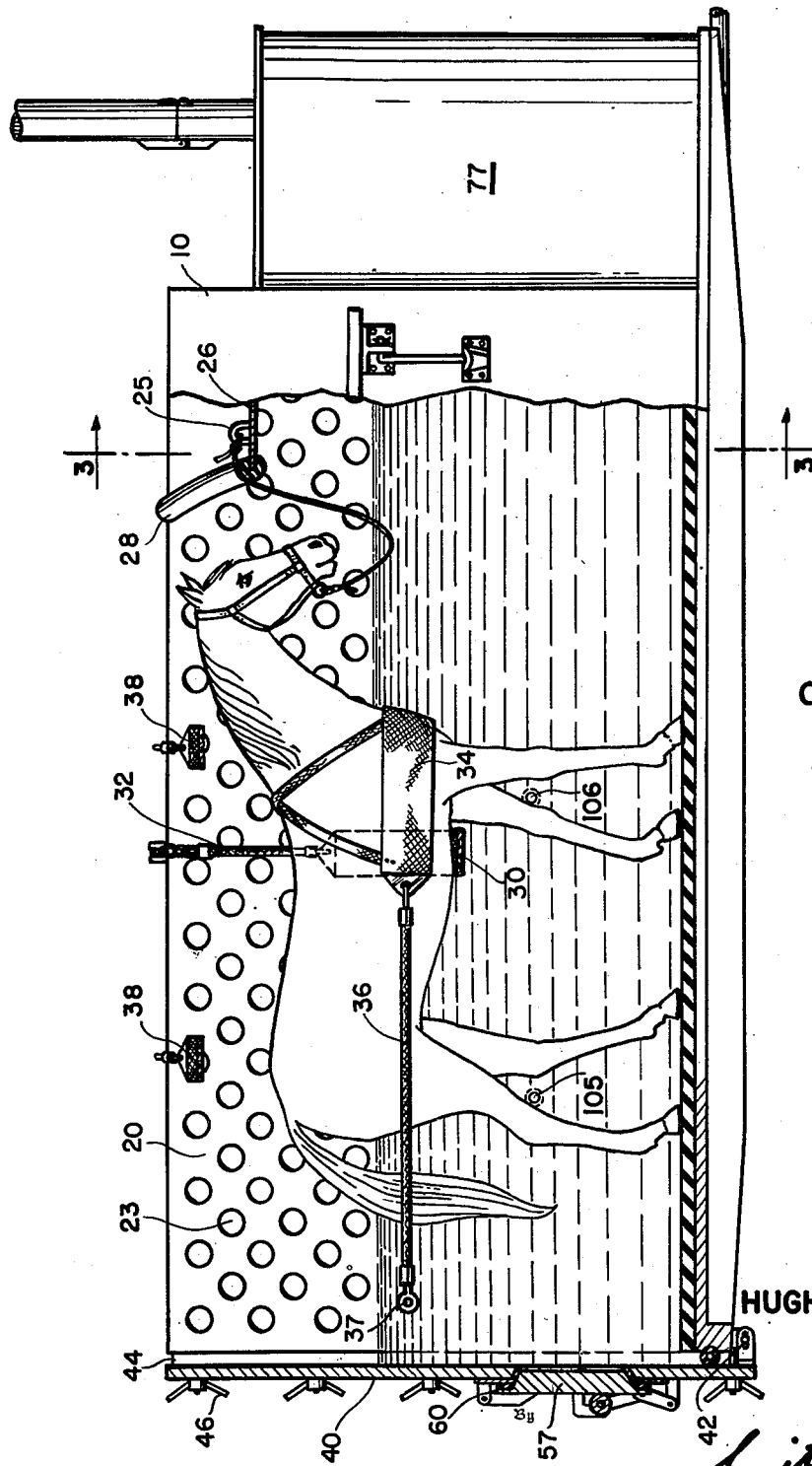
Figure 2 is a longitudinal, vertical, sectional view through a horse-bathing tub, following the teachings of my present invention.

Tub 12, as will best be understood from a study of Figure 2, is made sufficiently large so that a horse will have ample room therein so that he may be entirely lifted off his feet by the buoyancy of the water, and, under such conditions, will have ample room for the normal swimming strokes of his legs. At preferably the front end of the tub, I provide the hitching loop or loops 25 which are secured to a raised platform, as 26, and which I preferably supply with a resilient edge guard, as 28. This makes it possible to tie the horse's head above the normal water level as a matter of safety and convenience, and it also provides an excellent platform so that the horse may be given internal medicine, or the like.

It is very desirable, particularly in the treatment of ailing animals, to provide an adequate suspension arrangement. I, therefore, have provided one or more belly bands 30 with supporting means 32, which are, in turn, secured to the sides of the tank. I then provide a breast collar, as 34, which is supplied with what in effect are tugs 36, one on each side and which are, in turn, secured as at 37 to the side walls of the tank. Under certain conditions it may be desirable to provide vertically slidable anchors for the tugs or the breast collar. This makes it possible for a horse to swim in place, and any forward movement that his swimming might tend to give him will be arrested by the breast plate collar 34. Bands 38 are provided to restrain temperamental horses.

Tub 12 is normally provided with fixed sides, bottom and front, all of which are suitably joined together by welding or riveting so as to be watertight. However, in order to conveniently enter the horse into the tub, it is necessary that the rear end be provided with a removable or hinged end gate 40. Where the bathing tub is mounted on a vehicle, it is desirable that the end gate 40 be pivoted to the tub as at 42, so that it will serve as a ramp for the easy entrance of the horse into the tub. It is essential, however, that end gate 40 makes a watertight closure for the end of the tub, and to this end I have provided a resilient gasket 44 of U shape, which encircles the end of the tub up to the height of the water level. This gasket is compressed when the end gate is put in place by suitable means, as by a plurality of winged or spoked nuts 46, which, as will be noted in Figure 7, are provided at their inner ends with a hook 48. These hooks are adapted so as to engage rods or eyes 50, which are disposed within cup-like depressions 52 so that the engaging bars will be inwardly disposed from the outer surface of the fixed ends 54 of the tank. As a matter of convenience, I provide that these hooked members 48 each be provided with slots, as 53, which extend through the end gate 40.

As can happen, a horse may fall within the tank or may become seriously ill, and it may be desirable to unload the water from the tub very quickly, in order to prevent the horse drowning. For instance, I provide for this contingency a large capacity discharge opening or pipe having a quick opening closure. As one solution of this problem, I have inserted in end gate 40 the safety relief valve or gate 57. This valve, for reasons of convenience, I provide as a circular valve, the details of such being best shown in Figures 2 and 6. The valve gate 57 is pivoted as at 58 and seats upon a suitable gasket. Pressure is applied to insure the seating and compression of gasket 60 by some convenient means as the toggle lock means best illustrated in Figure 6. This consists of a roller 62 mounted upon a shaft 63. Shaft 63 is engaged under two hooks as 65, and the shaft is supported from the pivoted shaft 67 by means of the toggle linkage 69. As shown in Figure 6, it will be observed that the toggle is broken inwardly and thus provides a definite lock which will adequately support shaft 63. However, if it becomes necessary to release the safety door 57, the handles 70 on either side of the tank may be swung outwardly, thus revolving shaft 67 in bearings 72, and thereby breaking the toggles 69 outwardly. This will cause shaft 63 and roller 62 to fall downwardly, permitting the water pressure within the tub to open door 57 and discharge the water very quickly therefrom.

In order to achieve the objects of my invention I provide a group of power equipment in a forward housing, formed as part of the unit, as 74. This equipment must be capable of producing heat for heating the water, heat for heating air, piping and valves for controlling the flow of the fluids, and it must provide energy for driving the pumps and blowers that are essential. Figures 2 and 5 illustrate how this equipment can be conveniently housed behind preferably hinged doors, as 76 and 77, at the front end of a trailer, for instance. The various essential elements are shown in the diagrammatic view of Figure 4. Here I have provided preferably a boiler, fired by any suitable means so as to insure a large supply of hot water through pipe 82, which in turn is distributed through suitable valves, as 83, to the storage tanks 14 and 16. Water is supplied to boiler 80, preferably by thermo-syphon circulation, from the bottom of tanks 14 or 15 through header pipe 85 from either or both of tanks 14 and 16, in accordance with the setting of valves 87 and 88. In order to provide circulation of this hot water so that temperatures can be accurately maintained, a pump 90 is provided which draws water through the suction line 92, controlled by valves 94, 95, and 96, and which have suction pipes 94a, 95a, and 96a.

The discharge from pump 90 may be through the utility valve 98 or the normal service line 100. The normal service is through valves 102 and/or 103 into tub 12. Vaned outlet openings 105 and 106 deliver the water, in swirling streams, preferably about knee high on the horse. An alternate discharge is through valve 108, through the boiler 80 and out pipe 82 into either or both tanks 14 and 16 in accordance with the settings of valves 83.

Pump 90 is driven by motor 110, which is preferably rubber mounted and resiliently coupled to the pump.

Suitable means should be provided for the automatic control of the water temperature. This may be in the form of thermostats which will control the heat at the source, or it may control a by-pass arrangement. Such arrangements are well known to heating people and it is believed to be too well understood to complicate this present showing with a proper explanation thereof. As a safety precaution against too extreme temperatures I provide thermometers at various points of the circulatory system. I normally would prefer to provide an electric motor as 110 to operate the water pump 90, and also the air blower 112. Combined with the blower should be a heat exchanger which can be adequately supplied by the hot water pipes as 114 and 115, so that cold air can be drawn through the heat exchanger by the blower and delivered as hot air through the check valve 117, and through various outlets 118 within the bathing tub. Hot air injected in this way has been found to be very beneficial for certain treatments and also provides a convenient way to dry the horse after bathing. Check valve 117 is desirable to prevent the head of water in the tank from forcing water into the blower.

Additional safeguards should be provided, as for instance, the external thermometer 98, so as to acquaint the operator at all times with the condition of the water within the tub, and to thus prevent injury to any animal under treatment. It has been found desirable to provide a heat responsive electrical current interrupter as 122 and 123 in tanks 14 and 16 respectively, adapted to stop the motor driving the water pump if dangerous temperatures should occur in either of the tanks. Further, all water must pass through tempering tanks before being applied to a horse.

*Method of operation*

In using my horse bathtub, normally the operation starts with the water being held within the side tanks 14 and 16, and with the tub dry. The end gate 40 is lowered and the animal is led up the ramp thus provided, into the tub 12 where he is secured as to ring 25 with a conventional halter. The belly band 30 and the breast collar 34 are then put in place and properly adjusted. The end gate 40 is swung up into place and the plurality of securing hooks 48 tightened by means of their individual nuts 46. The temperature of the water in tanks 14 and 16 is then adjusted to that desired, and the water introduced by control of valves 94, 96, and 102, and the tank or tub filled to the desired level. The temperature of the water can be maintained by automatic or manual control, and any variations that are desired during the treatment period can be made. After the treatment, and swimming exercise, if desired, have been completed, the water is normally withdrawn from the tub and restored to tanks 14 and 16. The horse can be wiped, or dried by warm air, or warm air may be used as a treatment, it being desired to point out that my equipment permits of such great flexibility that a wide range of treatments can be administered.

It will be apparent, it is believed, that fresh water, salt water, or any desirable type of medicated bath may be used with my equipment.

At times hot air or hot vapor baths may be desirable and to retain the hot air, supplied by heat exchanger 92, I provide a cover 120 which may be used to partially or wholly enclose the bathing stall 12.

It is believed that it will be clearly apparent from the above description and the disclosure in the drawings that the invention comprehends a novel construction of a method and means for giving bath treatment to horses.

Having thus disclosed the invention, I claim:

1. Portable means for giving bath treatments to horses, comprising: a portable horse bathing stall of sufficient depth in which water may be retained so that a horse can be floated off his feet and of sufficient width and length to permit swimming of a horse therein; a watertight door for said stall of a size to permit the passing of a horse therethrough; water-tempering tanks disposed one on each side of said stall; a water heater; an air heater; conduits connecting the bottoms and tops of said tempering tanks with said water heater in a manner permitting thermo-siphon circulation therebetween; a power-driven water pump having selective suction conduits connected to the bottoms of said tempering tanks and said stall; a plurality of jet nozzles disposed in position to discharge water into said stall on a level to strike the legs of a horse and having insert deflectors adapted to produce a swirling action in the water discharge stream; conduits connecting the pressure side of said pump, selectively, to said nozzles or to said tempering tanks through said water heater; power driven air circulating means operatively connecting said hot air heater and said stall; horse positioning and restraining means in said stall; and emergency draining means for said stall.

2. A means for giving bath treatments to horses, comprising: a horse bathing stall of sufficient depth in which water may be retained so that a horse can be floated off his feet and of sufficient width and length to permit swimming of a horse therein; a watertight door for said stall; water tempering tanks disposed one on each side of said stall; a water heater; an air heater; conduits connecting the bottoms and tops of said tempering tanks with said water heater; a power driven water pump having selective suction conduits connected to the bottoms of said tempering tanks and said stall; a plurality of jet nozzles diposed in position to discharge water into said stall against a horse therein; conduits connecting the pressure side of said pump, selectively, to said nozzles or to said tempering tanks; a power driven air circulator operatively connecting said hot air heater and said stall; horse positioning and restraining means in said stall; and emergency draining means for said stall.

3. A means for giving bath treatments to horses, comprising: a horse bathing stall of sufficient depth in which water may be retained so that a horse can be floated off his feet and of sufficient width and length to permit swimming of a horse therein; a watertight door for said stall; water tempering tanks; a water heater; conduits connecting the bottoms and tops of said tempering tanks with said water heater; a power driven water pump having selective suction conduits connected to the bottoms of said tempering tanks and said stall; a plurality of jet nozzles disposed in position to discharge water into said stall to strike the legs of a horse; conduits connecting the pressure side of said pump, selectively, to said nozzles or to said tempering tanks; and horse positioning and restraining means in said stall.

4. Portable means for giving bath treatments to horses, comprising: a horse bathing stall of sufficient depth in which water may be retained so that a horse can be floated off his feet and of sufficient width and length to permit swimming of a horse therein; a watertight door for said stall of a size to permit the passing of a horse therethrough; water tempering tanks disposed one on each side of said stall; a water heater; conduits connecting the bottoms and tops of said tempering tanks with said water heater in a manner permitting thermo-siphon circulation therebetween; a power driven water pump having selective suction conduits connected to the bottoms of said tempering tanks and said stall; a plurality of jet nozzles disposed in position to discharge water into said stall on a level to strike the legs of a horse; conduits connecting the pressure side of said pump, selectively, to said nozzles or to said tempering tanks; horse positioning and restraining means in said stall; a vehicular base and said stall, water heater and pump being mounted on said base.

HUGH P. PARIS.

REFERENCES CITED

The following references are of record in the file of this patent:

UNITED STATES PATENTS

| Number | Name | Date |
| --- | --- | --- |
| 139,207 | Sullivan | May 20, 1873 |
| 257,596 | Mond | May 9, 1882 |
| 716,574 | Nimmo | Dec. 23, 1902 |
| 1,896,938 | Borowsky | Feb. 7, 1933 |
| 2,091,167 | Solley | Aug. 24, 1937 |
| 2,237,435 | Ille | Apr. 8, 1941 |
| 2,417,499 | Ille | Mar. 18, 1947 |
| 2,428,004 | Beyrodt | Sept. 30, 1947 |
| 2,480,600 | Paul, Jr. | Aug. 30, 1949 |
| 2,524,641 | Suttles, Jr. | Oct. 3, 1950 |
| 2,529,255 | Jobe | Nov. 7, 1950 |
| 2,529,530 | Abildgaard et al. | Nov. 14, 1950 |

FOREIGN PATENTS

| Number | Country | Date |
| --- | --- | --- |
| 105,590 | Great Britain | Apr. 16, 1917 |
| 101,172 | Australia | June 10, 1937 |